(12) United States Patent
Koyama

(10) Patent No.: US 10,890,829 B2
(45) Date of Patent: Jan. 12, 2021

(54) MOVABLE OBJECT AND METHOD FOR MANUFACTURING PHOTOGRAPHING DEVICE

(71) Applicant: SZ DJI TECHNOLOGY CO., LTD., Shenzhen (CN)

(72) Inventor: Takashi Koyama, Tokyo (JP)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/262,573

(22) Filed: Jan. 30, 2019

(65) Prior Publication Data

US 2019/0163037 A1 May 30, 2019

Related U.S. Application Data

(63) Continuation of application No. PCT/JP2016/073264, filed on Aug. 8, 2016.

(51) Int. Cl.
*G03B 17/55* (2006.01)
*B64C 39/02* (2006.01)
(Continued)

(52) U.S. Cl.
CPC ............ *G03B 17/55* (2013.01); *B64C 27/08* (2013.01); *B64C 39/02* (2013.01); *B64D 47/08* (2013.01); *G03B 15/006* (2013.01); *H04N 5/2252* (2013.01); *H04N 5/2253* (2013.01); *H04N 5/22521* (2018.08)

(58) Field of Classification Search
CPC ........... H04N 5/23248; H04N 5/23264; H04N 5/2328; H04N 5/23283; H04N 5/23287; H04N 5/22521; H04N 5/2252; H04N 5/2253; H04N 5/23296; H04N 5/232935; H04N 5/232939; H04N 5/23245; H04N 5/23229; H04N 5/2628; H04N 5/232; H04N 5/23212; H04N 5/235; G03B 17/55;
(Continued)

(56) References Cited

U.S. PATENT DOCUMENTS 9,769,361 B2 * 9/2017 Lee .................. H04N 5/2252
2004/0169771 A1 * 9/2004 Washington .......... H04N 5/2253
348/374
(Continued)

FOREIGN PATENT DOCUMENTS

JP 2009164455 A 7/2009
JP 2009200912 A 9/2009
(Continued)

OTHER PUBLICATIONS

The World Intellectual Property Organization (WIPO) The International Search Report for PCT/JP2016/073264 dated Oct. 25, 2016 5 pages.

*Primary Examiner* — Albert H Cutler
(74) *Attorney, Agent, or Firm* — Anova Law Group, PLLC

(57) ABSTRACT

A movable object includes a photographing device, a support member supporting the photographing device, and a propulsion system configured to propel the movable object. The photographing device includes an image sensor, a housing accommodating the image sensor, a heat conductor configured to transmit heat generated by the image sensor to the housing, and a heat radiator provided on an outer surface of the housing.

13 Claims, 12 Drawing Sheets

(51) Int. Cl.
*B64C 27/08* (2006.01)
*H04N 5/225* (2006.01)
*G03B 15/00* (2006.01)
*B64D 47/08* (2006.01)

(58) Field of Classification Search
CPC ....... G03B 15/006; B64C 39/02; B64C 27/08; B64D 47/08
See application file for complete search history.

(56) References Cited

U.S. PATENT DOCUMENTS

| | | | | |
|---|---|---|---|---|
| 2007/0002148 | A1* | 1/2007 | Takahashi | H04N 5/2253 348/219.1 |
| 2008/0297635 | A1* | 12/2008 | Aoki | H04N 5/217 348/294 |
| 2009/0273693 | A1* | 11/2009 | Aoki | H04N 5/23248 348/294 |
| 2013/0271920 | A1* | 10/2013 | Chun | H01L 23/3672 361/705 |
| 2014/0055670 | A1* | 2/2014 | Hongo | H04N 5/2253 348/374 |
| 2014/0184835 | A1* | 7/2014 | Nozawa | H04N 5/2252 348/208.3 |
| 2016/0114887 | A1* | 4/2016 | Zhou | B60F 5/02 348/148 |
| 2016/0291445 | A1* | 10/2016 | Fisher, Sr. | G03B 15/006 |
| 2017/0031152 | A1* | 2/2017 | Khechana | B81C 3/005 |
| 2019/0041600 | A1* | 2/2019 | Sakamoto | G03B 15/00 |

FOREIGN PATENT DOCUMENTS

| | | |
|---|---|---|
| JP | 2010023825 A | 2/2010 |
| JP | 2010239581 A | 10/2010 |
| JP | 2013182923 A | 9/2013 |
| JP | 2014011484 A | 1/2014 |
| JP | 2014183367 A | 9/2014 |
| JP | 2015023343 A | 2/2015 |
| JP | 2015072960 A | 4/2015 |
| JP | 2015209207 A | 11/2015 |
| WO | 2009123266 A1 | 10/2009 |
| WO | 2016101155 A1 | 6/2016 |

\* cited by examiner

300

400

MOVABLE OBJECT AND METHOD FOR MANUFACTURING PHOTOGRAPHING DEVICE

CROSS-REFERENCE TO RELATED APPLICATION

This application is a continuation of International Application No. PCT/JP2016/073264, filed on Aug. 8, 2016, the entire contents of which are incorporated herein by reference.

TECHNICAL FIELD

The present disclosure relates to a movable object and a method for manufacturing a photographing device.

BACKGROUND ART

In Patent Document 1 and Patent Document 2, a heat dissipation structure for radiating heat generated by a photographing element is disclosed.
Patent Document 1: JP-A-2015-23343
Patent Document 2: JP-A-2015-72960

SUMMARY

Problems to be Solved by the Disclosure

It is desired that the heat generated by a photographing element of a photographing device mounted in a movable object be efficiently radiated. Alternatively, it is desired that a member for promoting the radiation of the heat generated by the photographing element be arranged at an appropriate position in the photographing device provided with the photographing element.

Means for Solving the Problems

The movable object related to an aspect of the present disclosure comprises a photographing unit, a support member for supporting the photographing unit, and a propulsion unit for propelling the movable object. The photographing unit includes an image sensor, a housing for accommodating the image sensor, a member for transmitting heat generated by the image sensor to the housing, and a heat dissipation part provided on an outer surface of the housing.

The photographing unit may further include a holding member for holding the image sensor. The member may contact the inner surface of the housing and the holding member.

A mark indicating an area to be contacted by the member may be provided on at least one of the inner surface of the housing and the holding member.

The mark may comprise a first mark provided on the inner surface of the housing and indicating an area to be contacted by a part of the member. The mark may comprise a second mark provided in the holding member and indicating an area to be contacted by another part of the member.

The holding member may comprise a substrate on which the image sensor is mounted. It may comprise an adjustment unit which is thermally connected to the substrate and adjusts the position or orientation of the substrate. The member may contact the inner surface of the housing and the adjustment unit.

The adjustment unit may comprise a first plate for adjusting the position of the substrate. The adjustment unit may comprise a second plate for adjusting the orientation of the substrate. The member may contact the inner surface of the housing and the first plate or the second plate.

The heat dissipation part is provided on a part of the outer surface of the housing, and may have a higher heat dissipation efficiency than other areas on the outer surface of the housing. The heat dissipation part may include at least one of a recessed portion and a protruding portion provided on the outer surface of the housing.

The heat dissipation part may include at least one fin as the protruding portion. The photographing unit may further include a lens for forming an image of the incident light on the image sensor. The at least one fin may be arranged along an optical axis of the lens.

The heat dissipation part may include at least one of a plurality of the recessed portions each having a dot shape and a plurality of the protruding portions each having a dot shape as at least one of the recessed portion and the protruding portion. The heat dissipation part may include at least one fin as the protruding portion in a first area on the outer surface of the housing, and at least one of a plurality of the recessed portions each having a dot shape and a plurality of the protruding portions each having a dot shape as at least one of the recessed portion and the protruding portion in a second area on the outer surface of the housing.

The member may be a sheet. The sheet may comprise a metal layer. The sheet may further comprise an adhesive layer partially contacting the inner surface of the housing.

The movable object related to an aspect of the present disclosure comprises a photographing unit, a support member for supporting the photographing unit, and a propulsion unit for propelling the movable object. The photographing unit may include an image sensor, a housing for accommodating the image sensor, and a sheet for transmitting heat generated by the image sensor to the housing.

The photographing unit may further include a holding member for holding the image sensor. The sheet may contact the inner surface of the housing and the holding member.

A mark indicating an area to be contacted by a sheet may be provided on at least one of the inner surface of the housing and the holding member.

The mark may comprise a first mark provided on the inner surface of the housing and indicating an area to be contacted by a part of the sheet. The mark may comprise a second mark provided in the holding member and indicating an area to be contacted by another part of the sheet.

The holding member may comprise a substrate on which the image sensor is mounted. The holding member may comprise an adjustment unit which is thermally connected to the substrate and adjusts the position or orientation of the substrate. The sheet may contact the inner surface of the housing and the adjustment unit.

The adjustment unit may comprise a first plate for adjusting the position of the substrate. The adjustment unit may comprise a second plate for adjusting the orientation of the substrate. The sheet may contact the inner surface of the housing and the first plate or the second plate.

The movable object related to an aspect of the present disclosure comprises a photographing unit, a support member for supporting the photographing unit, and a propulsion unit for propelling the movable object. The photographing unit includes an image sensor, a holding member for holding the image sensor, a housing for accommodating the image sensor and the holding member, and a mark provided on at least one of an inner surface of the housing and the holding member and indicating an area to be contacted by a member that transmits heat generated by the image sensor to the housing.

The mark may comprise a first mark provided on the inner surface of the housing and indicating an area to be contacted by a part of the member. The mark may comprise a second mark provided in the holding member and indicating an area to be contacted by another part of the member.

The holding member may comprise a substrate on which the image sensor is mounted. The holding member may comprise an adjustment unit which is thermally connected to the substrate and adjusts the position or orientation of the substrate. The second mark may be provided on the adjustment unit.

The adjustment unit may comprise a first plate for adjusting the position of the substrate. The adjustment unit may comprise a second plate for adjusting the orientation of the substrate. The second mark may be provided on the first plate or the second plate.

The member may be a sheet. The sheet may comprise a metal layer. The sheet may further comprise an adhesive layer partially contacting the inner surface of the housing.

A method according to an aspect of the present disclosure is for manufacturing a photographing device including an image sensor, a holding member for holding the image sensor, and a housing for accommodating the image sensor and the holding member, and the method comprising a process of forming, on at least one of an inner surface of the housing and the holding member, a mark indicating an area to be contacted by a member that transmits heat generated by the image sensor to the housing, and a process of fixing the holding member into the housing.

The process of forming the mark may include a process of forming, on the inner surface of the housing, a first mark indicating an area to be contacted by a part of the member. The process of forming the mark may include a process of forming, in the holding member, a second mark indicating an area to be contacted by another part of the member.

The method for manufacturing the photographing device may further comprise a process of arranging the member in contact with the holding member and the inner surface of the housing in accordance with the mark.

The above summary of the disclosure does not enumerate all the features of the present disclosure. Sub-combinations of these feature groups may also be made.

DETAILED DESCRIPTION

Hereinafter, the present disclosure will be described through embodiments of the present disclosure, but the following embodiments are not intended to limit the invention according to the claims. In addition, all combinations of features described in the embodiments are not necessarily indispensable for the solution means of the disclosure.

Figure 1:
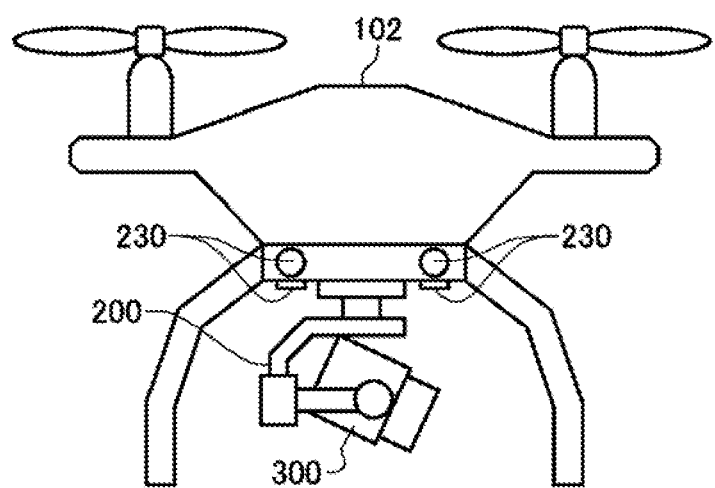
FIG. 1 is a diagram showing an example of the appearance of a UAV.

FIG. 1 shows an example of an appearance of an unmanned aerial vehicle (UAV) 100. The UAV 100 comprises a UAV main body 102, a gimbal 200, a photographing device 300, and a plurality of photographing devices 230. The UAV 100 is an example of a movable object propelled by a propulsion unit (propulsion system). The movable object refers to a concept including, in addition to the UAV, other aircraft moving in the air, a vehicle moving on the ground, a ship moving on water, and the like.

The UAV main body 102 comprises a plurality of rotary wings. The plurality of rotary wings are examples of the propulsion unit. The UAV main body 102 causes the UAV 100 to fly by controlling the rotation of the plurality of rotary wings. The UAV main body 102, for example, uses four rotary wings to fly the UAV 100. The number of rotary wings is not limited to four. In addition, the UAV 100 may be a fixed wing machine without rotary wings.

The photographing device 300 is a camera for photographing a subject within a desired photographing range. The photographing device 300 is an example of a photographing unit. The photographing device 300 comprises a lens unit comprising at least one lens and a photographing unit that generates image data from the image formed by the lens unit. The lens unit and the photographing unit may be integrally configured. The lens unit may be a so-called interchangeable lens and may be configured to be detachable from the photographing unit. The plurality of photographing devices 230 are sensing cameras for photographing surroundings of the UAV 100 in order to control the flight of the UAV 100. Two photographing devices 230 may be provided on a front surface, i.e., a nose, of the UAV 100. Furthermore, another two photographing devices 230 may be provided on a bottom surface of the UAV 100. The two photographing devices 230 on the front side are paired and may function as a so-called stereo camera. The two photographing devices 230 on the bottom side are also paired and may function as a so-called stereo camera. Based on images imaged by the plurality of photographing devices 230, three-dimensional spatial data around the UAV 100 may be generated. The number of photographing devices 230 provided in the UAV 100 is not limited to four. The UAV 100 may comprise at least one photographing device 230. The UAV 100 may comprise at least one photographing device 230 on the nose, a tail, a side surface, the bottom surface, and a ceiling surface of the UAV 100 separately. An angle of view that can be set by the photographing devices 230 may be larger than an angle of view that can be set by the photographing device 300. The photographing device 230 may include a single focus lens or a fisheye lens.

Figure 2:
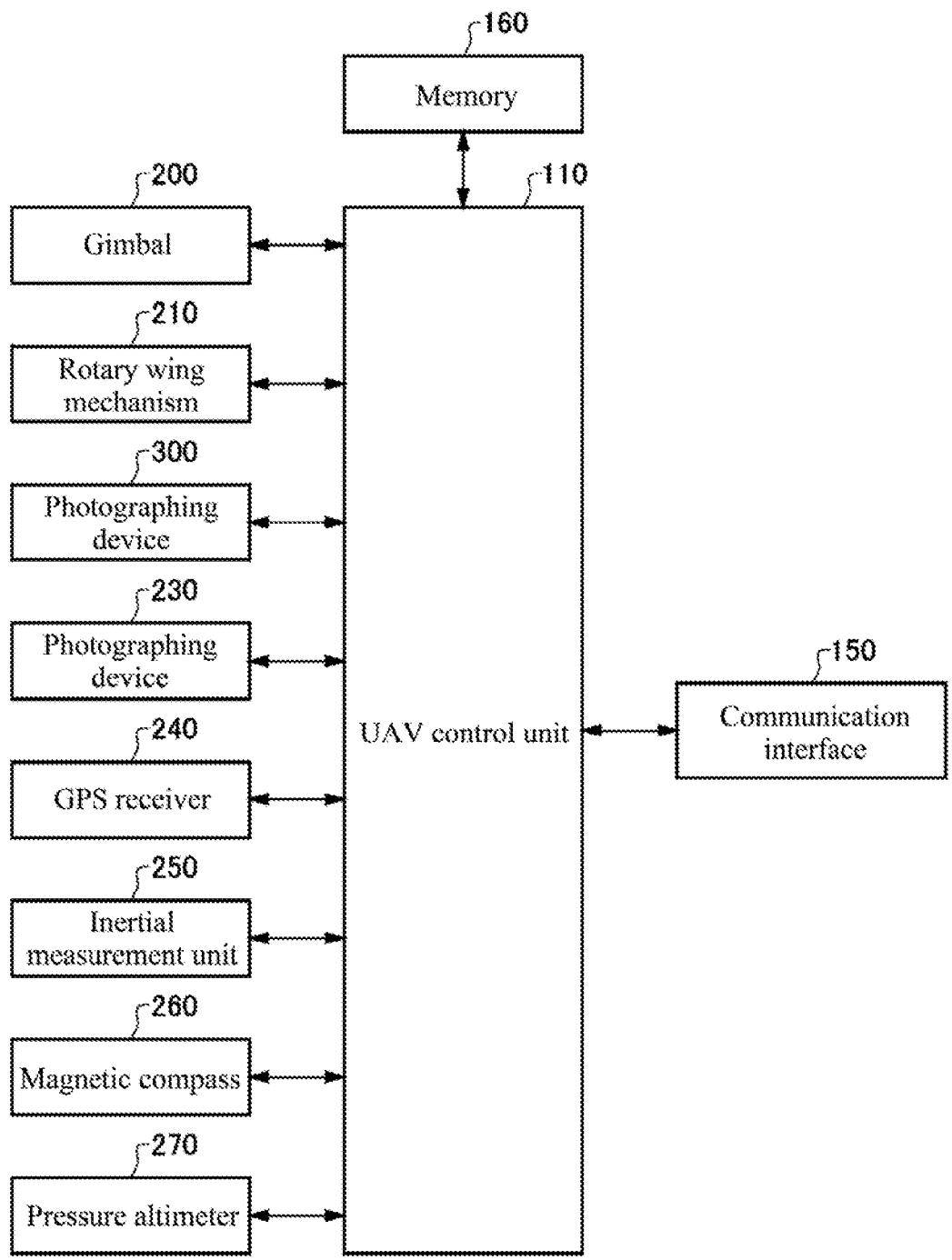
FIG. 2 is a diagram showing an example of functional blocks of a UAV.

FIG. 2 shows an example of functional blocks of a UAV 100. The UAV 100 comprises a UAV control unit 110, a communication interface 150, a memory 160, a gimbal 200, a rotary wing mechanism 210, a photographing device 300, photographing devices 230, a GPS receiver 240, an inertial measurement unit (IMU) 250, a magnetic compass 260, and a pressure altimeter 270.

The communication interface 150 communicates with an external transmitter. The communication interface 150 receives various commands for the UAV control unit 110 from the remote transmitter. The memory 160 stores programs or the like necessary for the UAV control unit 110 to control the gimbal 200, the rotary wing mechanism 210, the photographing device 300, the photographing device 230, the GPS receiver 240, the IMU 250, the magnetic compass 260, and the pressure altimeter 270. The memory 160 may be a computer-readable recording medium, and may comprise at least one of a flash memory such as an SRAM, a DRAM, an EPROM, an EEPROM, and a USB memory. The memory 160 may be provided in the UAV main body 102. The memory may be detachably provided from the UAV main body 102.

The gimbal 200 supports the photographing device 300 rotatably around at least one axis. The gimbal 200 supports the photographing device 300 when the outer surface of the photographing device 300 is exposed from the external environment. The gimbal 200 is an example of a support member. The gimbal 200 may rotatably support the photographing device 300 around the yaw axis, the pitch axis, and the roll axis. The gimbal 200 causes the photographing device 300 to rotate around at least one of the yaw axis, the pitch axis and the roll axis, and thereby the photographing direction of the photographing device 300 may be changed. The rotary wing mechanism 210 includes multiple rotary wings and multiple drive motors for rotating the multiple rotary wings.

The photographing device 300 photographs an image of a subject in a desired photography range and generates image data. The image data of the photographing device 300 is stored in a memory included in the photographing device 300 or the memory 160. The photographing devices 230 photograph the surroundings of the UAV 100 and generates image data. The image data of the photographing devices 230 is stored in the memory 160.

The GPS receiver 240 receives a plurality of signals indicating the time transmitted from a plurality of GPS satellites. The GPS receiver 240 calculates, based on the multiple received signals, the position of the GPS receiver 240 (i.e. UAV 100). The inertial measurement unit (IMU) 250 detects the posture of the UAV 100. The IMU 250 detects accelerations in three axial directions, i.e., front-rear, left-right, and up-down directions, of the UAV 100, and angular velocities in three axial directions, i.e., the pitch axis, the roll axis, and the yaw axis, as the posture of the UAV 100. The magnetic compass 260 detects the orientation of the nose of the UAV 100. The pressure altimeter 270 detects a flight altitude of the UAV 100.

The UAV control unit 110 controls the flight of the UAV 100 according to a program stored in the memory 160. The UAV control unit 110 may be configured by a microprocessor such as a CPU or MPU, a microcontroller such as an MCU, or the like. The UAV control unit 110 controls the flight of the UAV 100 according to a command received from the remote transmitter via the communication interface 150.

The UAV control unit 110 may specify the surrounding environment of the UAV 100 by analyzing multiple images captured by the multiple photographing devices 230. The UAV control unit 110 controls the flight to avoid, for example, obstacles based on the surrounding environment of the UAV 100. The UAV control unit 110 may generate three-dimensional spatial data around the UAV 100 based on a plurality of images photographed by the plurality of photographing devices 230, and may control the flight based on the three-dimensional spatial data.

Figure 3:
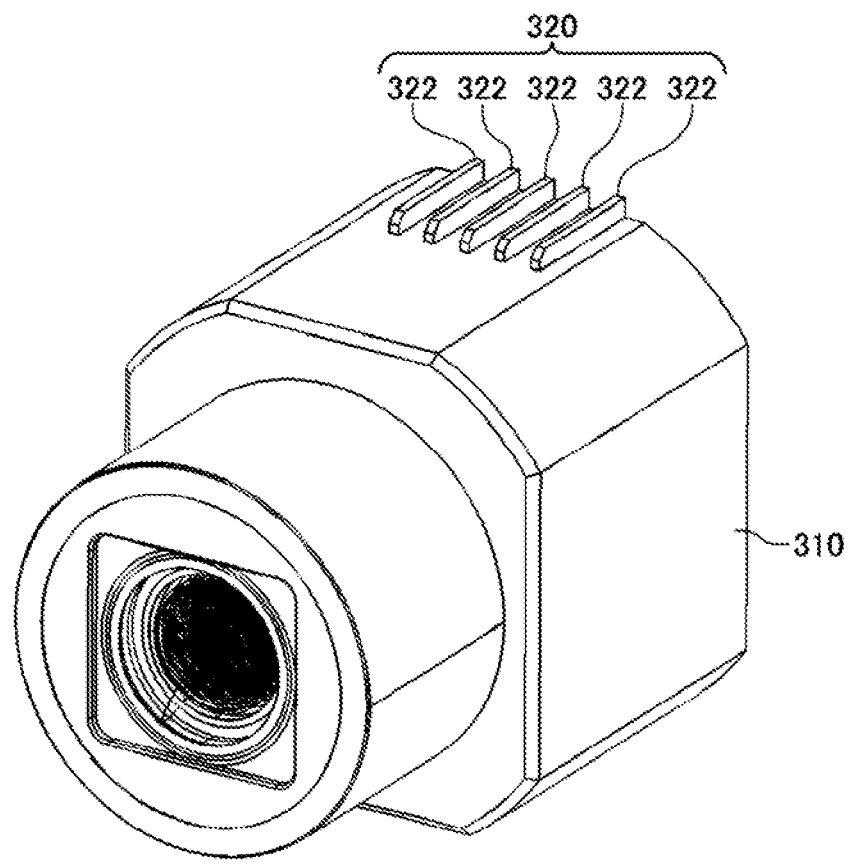
FIG. 3 is a perspective view showing an example of the external appearance of a photographing device.

FIG. 3 is a diagram showing an example of the external appearance of a photographing device 300. The photographing device 300 is supported by the UAV main body 102 via the gimbals 200. The photographing device 300 comprises a housing 310 and a heat dissipation part 320, also referred to as a heat radiator. The heat dissipation part 320 is provided on the outer surface of the housing 310. The photographing device 300 comprises an image sensor and a lens. The image sensor and the lens are accommodated in the housing 310. The lens forms an image of the incident light on the image sensor.

The heat dissipation part 320 is provided on a part of an outer surface of the housing 310, and may have a higher heat dissipation efficiency than other areas on the outer surface of the housing 310. The heat dissipation part 320 may comprise a plurality of fins 322. The plurality of fins 322 may be arranged along an optical axis of the lens. The structure of the heat dissipation part 320 is not limited to the above. The heat dissipation part 320 may include at least one of a recessed portion and a protruding portion provided on the outer surface of the housing. The heat dissipation part 320 may include at least one fin as the protruding portion. The heat dissipation part 320 may include at least one of a plurality of the dotted recessed portions and a plurality of dotted protruding portions. The heat dissipation part 320 may include at least one fin as the protruding portion in a first area on the outer surface of the housing, and at least one of the plurality of the dotted recessed portions and the plurality of the dotted protruding portions as at least one of the recessed portion and the protruding portion in a second area on the outer surface of the housing.

The photographing device 300 may comprise a member such as a sheet that transmits/conducts the heat generated by the image sensor to the housing 310. The member, also referred to as a heat conductor, contacts the inner surface of the housing 310 and the holding member for holding the image sensor. The heat generated by the image sensor is transmitted to the housing 310 via the member. The gimbal 200 supports the housing 310 when the heat dissipation part 320 is exposed to the external environment. The external environment refers to a space in which the UAV 100 moves. The gimbal 200 may support the housing 310 when the outer surface of the heat dissipation part 320 is exposed to the space where the UAV 100 moves. The gimbal 200 may support the housing 310 when the outer surface of the heat dissipation part 320 is exposed to the air in the space where the UAV 100 moves.

The higher the temperature of the image sensor, the worse the quality of the image. For example, when the handheld camera generates heat, measures to interrupt the photographing operation by the camera, such as turning off the camera, are taken. However, since the photographing device 300 mounted on the UAV 100 photographs in a limited time, measures taken for the hand-held camera are not preferable. When the size of the image sensor increases, the necessity of cooling the image sensor further increases. According to the photographing device 300 related to the present embodiment, the heat transmitted to the housing 310 is efficiently dissipated via the heat dissipation part 320. When the UAV 100 is flying, wind is likely to be applied to the heat dissipation part 320. By means of the wind, the heat is dissipated more efficiently via the heat dissipation part 320. By efficiently dissipating heat generated by the image sensor, it is possible to suppress degradation of the image photographed by the photographing device 300. It is possible to lengthen the photographing time of the image sensor. While the UAV 100 is flying, photographing by the photographing device 300 can be continued. It is possible to easily enlarge the size of the image sensor mounted on the photographing device 300.

Figure 4:
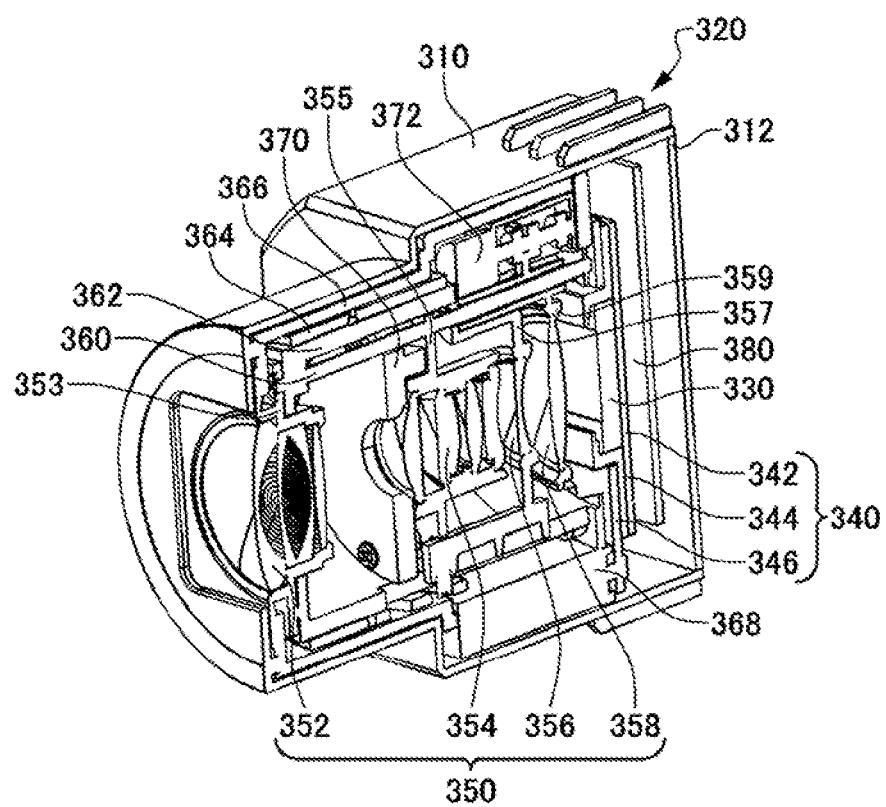
FIG. 4 is an example of a cross-sectional perspective view of a photographing device.

FIG. 4 is an example of a cross-sectional perspective view of a photographing device 300. The photographing device 300 comprises a lens 350 and an image sensor 330. The lens 350 comprises a first lens group 352, a second lens group 354, a third lens group 356, and a fourth lens group 358. The first lens group 352, the second lens group 354, and the third lens group 356 may function as a zoom lens. The fourth lens group 358 may function as a focus lens. The configuration of the lens 350 is not limited to the above. The configuration of the lens 350 may be designed, depending on the function of the photographing device 300.

The image sensor 330 is fixed to the housing 310 via the holding member 340 (holder). The holding member 340 holds the image sensor 330 when being thermally connected to the image sensor 330. The holding member 340 comprises a substrate 342, a first plate 344, and a second plate 346. The substrate 342 mounts the image sensor 330. The first plate 344 and the second plate 346 are examples of adjustment unit (adjustor) for adjusting the position or orientation of the substrate 342. The first plate 344 and the second plate 346 may be metal plates. The image sensor 330, the substrate 342, the first plate 344, and the second plate 346 are thermally connected. A member such as a sheet may contact the inner surface 314 of the housing 310 and the adjustment unit. A member such as a sheet may contact the inner surface 314 of the housing 310 and the first plate 344 or the second plate 346. In the specification, when a member is thermally coupled to other member refers to when at least a part of a member is in direct contact with at least a part of other member such that heat from a member is directly transmitted to other member. In addition, it also refers to when a member is separated from another member to such an extent that heat from the member is indirectly transmitted to the other member via a medium such as air.

The first plate 344 is fixed to the substrate 342 via screws. By adjusting the position of the substrate 342 with respect to the first plate 344, the position of the image sensor 330 with respect to the lens 350 can be adjusted. The second plate 346 is fixed to the first plate 344 via screws. By adjusting the orientation of the substrate 342 with respect to the second plate 346, the orientation of the image sensor 330 with respect to the lens 350 can be adjusted. The second plate 346 is fixed to the housing 310 via screws.

The photographing device 300 further includes a shaft 360, a fixed cylinder 362, a cam cylinder 364, a holding frame 366, a gear unit 368, and a stepping motor 372. The fixed cylinder 362 is fixed to the housing 310. On the outer periphery of the fixed cylinder 362, a cam pin is provided. The gear unit 368 rotates the cam cylinder 364 around the optical axis of the lens 350. The cam cylinder 364 comprises a cam groove. As the cam groove is guided by the cam pin, the cam cylinder 364 moves in the optical axis direction while rotating.

The first lens group 352 is fixed to the fixed cylinder 362 via the first lens holding member 353. The second lens group 354 is held on the shaft 360 via the second lens holding member 355 so as to be slidable in the optical axis direction. The third lens group 356 is held on the shaft 360 via the third lens holding member 357 so as to be slidable in the optical axis direction. The fourth lens group 358 is held on the shaft 360 via the fourth lens holding member 359 so as to be slidable in the optical axis direction.

The second lens holding member 355 and the third lens holding member 357 comprise cam pins that engage with the cam groove of the cam cylinder 364. When the cam cylinder 364 rotates, the cam pins of the second lens holding member 355 and the third lens holding member 357 are guided by the cam groove of the cam cylinder 364, and the second lens group 354 and the third lens group 356 move in the optical axis direction.

A cam unit is provided on a rotary shaft of the stepping motor 372. The fourth lens holding member 359 comprises a follower unit engaged with the cam unit. As the stepping motor 372 is driven, the follower unit moves along the cam surface of the cam unit. Accordingly, the fourth lens group 358 moves in the direction of the optical axis.

The photographing device 300 further includes a shutter unit 370 and an IMU substrate 380. The shutter unit 370 moves in the optical axis direction together with the second lens group 354. The IMU substrate 380 detects the posture of the photographing device 300.

The housing 310 comprises a lid unit 312. The lid unit 312 is detachably provided on the back surface of the housing 310. After the various components such as the lens 350 and the image sensor 330 are accommodated in the housing 310, the lid unit 312 is fixed to the back surface of the housing 310.

Figure 5:
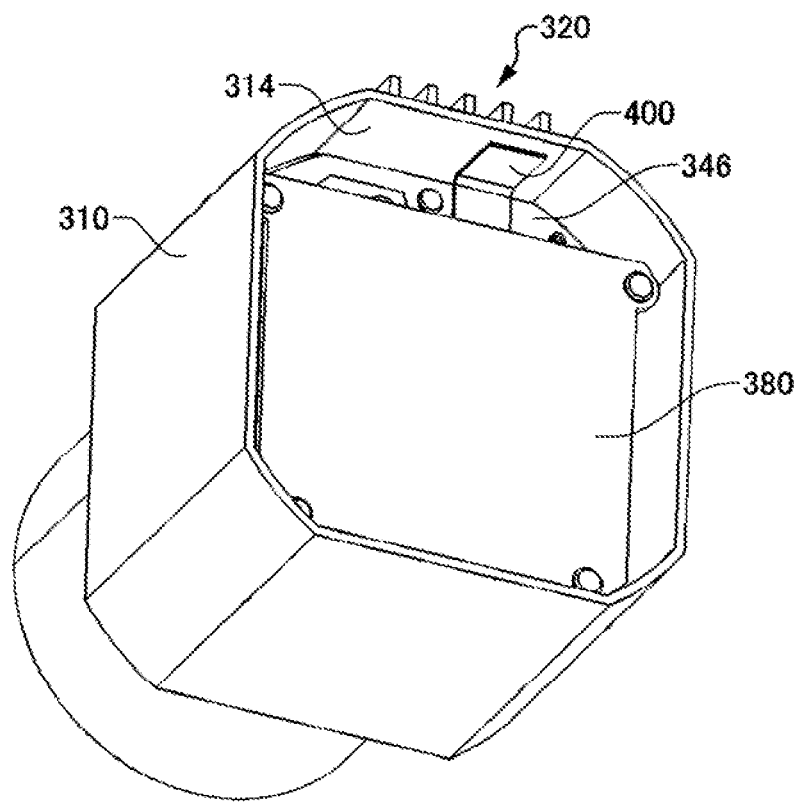
FIG. 5 is a diagram showing an example of the arrangement of a sheet provided in a photographing device.
Figure 6:
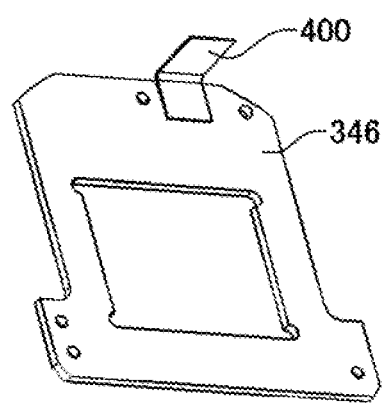
FIG. 6 is a diagram showing an example of a second plate on which a sheet is arranged.

FIG. 5 is a diagram showing an example of the arrangement of a sheet 400 provided in a photographing device 300. FIG. 5 shows a view of the photographing device 300 with the lid unit 312 detached from the back of the photographing device 300. FIG. 6 is a diagram showing an example of a second plate 346 on which a sheet 400 is arranged. The sheet 400 is an example of a member that transmits the heat generated by the image sensor 330 to the housing 310. The sheet 400 contacts the inner surface 314 of the housing 310 and the second plate 346. The sheet 400 is thermally connected to the housing 310 and the second plate 346. The heat generated by the image sensor 330 is transmitted to the housing 310 via the substrate 342, the first plate 344, the second plate 346, and the sheet 400. The sheet 400 may contact the first plate 344 or the substrate 342.

A heat dissipation part 320 may be provided on the outer surface of the housing 310 opposite to the inner surface 314 of the housing 310 that the sheet 400 contacts. Accordingly, the heat transmitted from the sheet 400 to the housing 310 can be more easily dissipated to the external environment.

Figure 7:
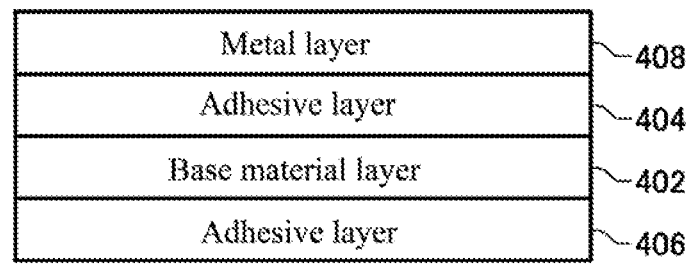
FIG. 7 is a diagram showing an example of a structure of a sheet.

FIG. 7 shows an example of a structure of a sheet 400. The sheet 400 may be configured by a multilayer film. The sheet 400 comprises a base material layer 402, an adhesive layer 404, an adhesive layer 406, and a metal layer 408. The base material layer 402 is arranged between the adhesive layer 404 and the adhesive layer 406. The base material layer 402, the adhesive layer 404, and the adhesive layer 406 may be configured by a double-sided tape. The base material layer 402 may be configured by a plastic film. The plastic film may be configured by a polyolefin film, a polyethylene film, a polypropylene film, an EVA film, an EAA film, an ionomer film or the like.

The metal layer 408 is arranged on the adhesive layer 404 arranged on one surface of the base material layer 402. The metal layer 408 may be configured by a film having a high heat transmission coefficient such as metal foil such as aluminum, a film containing metal particles, a graphite film, or the like.

The sheet 400 contacts the inner surface 314 of the housing 310 and the holding member 340 via the adhesive layer 406 arranged on the other surface of the base material layer 402. The sheet 400 may be pasted to the inner surface 314 of the housing 310 and the holding member 340 via the adhesive layer 406.

Figure 8:
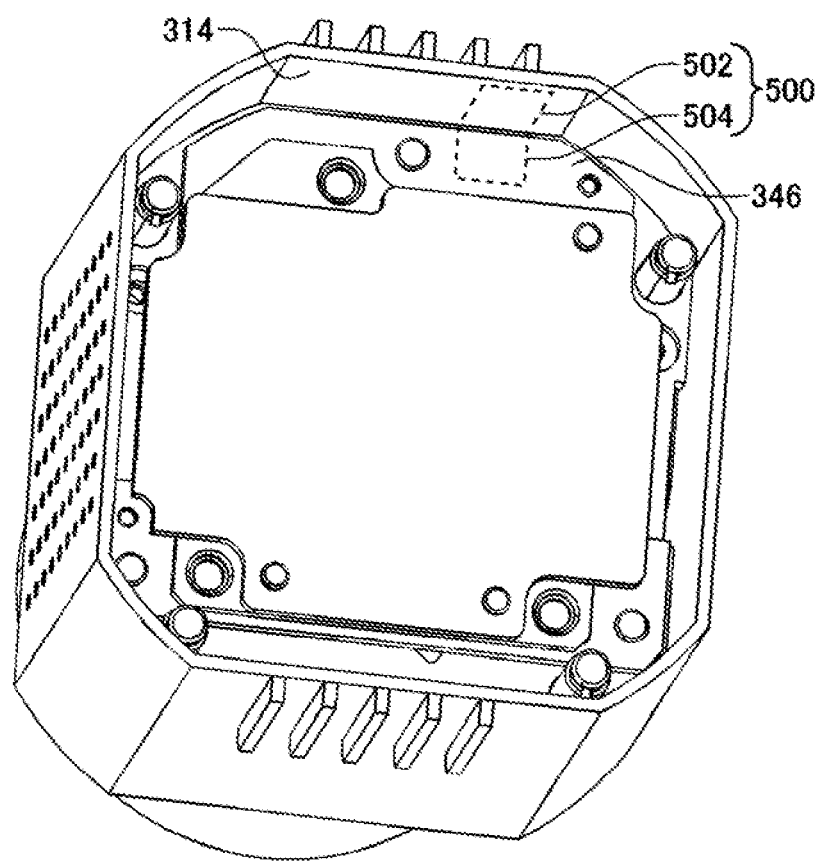
FIG. 8 is a diagram showing an example of a mark.
Figure 9:
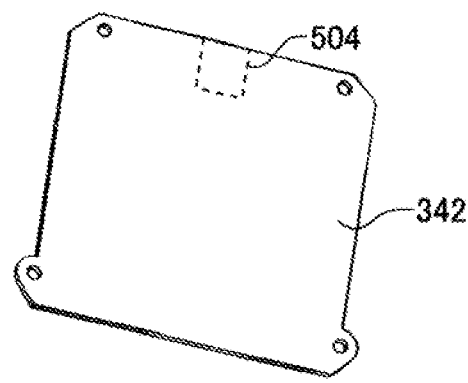
FIG. 9 is a diagram showing an example of a mark.

FIGS. 8 and 9 show an example of a mark 500 indicating an area to be contacted by a member such as the sheet 400. The mark 500 comprises a first mark 502 and a second mark 504. The first mark 502 is provided on the inner surface 314 of the housing 310 and indicates an area to be contacted by a part of the sheet 400. The second mark 504 is provided on the second plate 346 and indicates an area to be contacted by another part of the sheet 400. The second mark 504 may be provided on other member configuring the holding member 340. The second mark 504 may be provided on the substrate 342 as shown in FIG. 9. The mark 500 may comprise at least one of the first mark 502 and the second mark 504. The mark 500 may be provided only on the inner surface 314 of the housing 310. Or, the mark 500 may be provided only on the second plate 346, the first plate 344, or the substrate 342.

The mark 500 may be provided in such a manner that the mark 500 can be visually recognized with naked eyes or auxiliary instruments. The mark 500 may be provided by, for example, laser processing, scribing processing, scratch processing, printing, or the like. Since the mark 500 is provided in the area to be contacted by the sheet 400, the sheet 400 can be easily arranged at an appropriate position.

Figure 10:
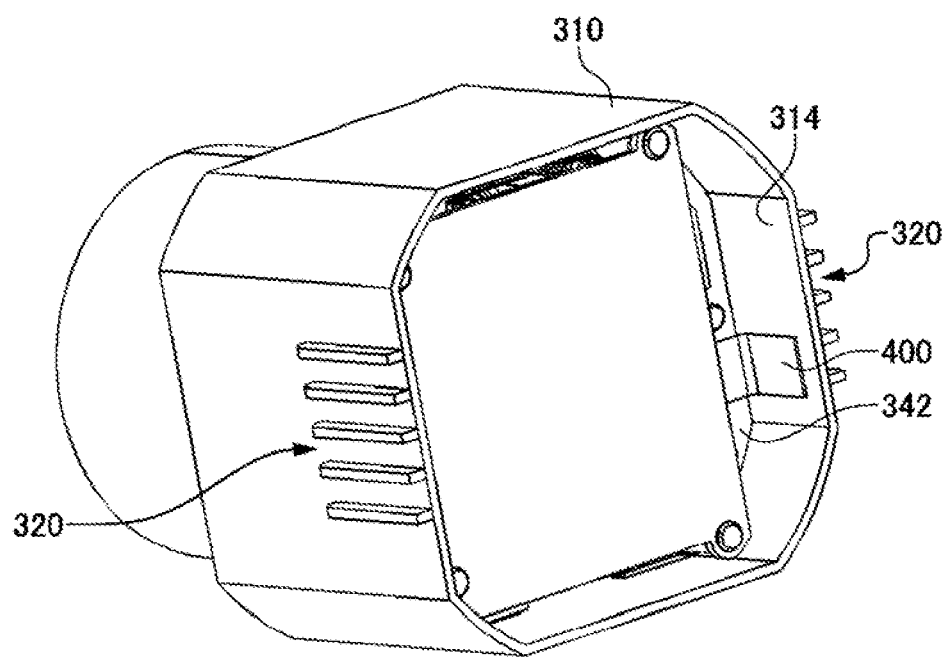
FIG. 10 is a diagram showing an example of other arrangement of a sheet provided in a photographing device.

FIG. 10 is a diagram showing another arrangement example of the sheet 400 arranged in the photographing device 300. The sheet 400 may contact the inner surface 314 of the housing 310 and the substrate 342.

Figure 11:
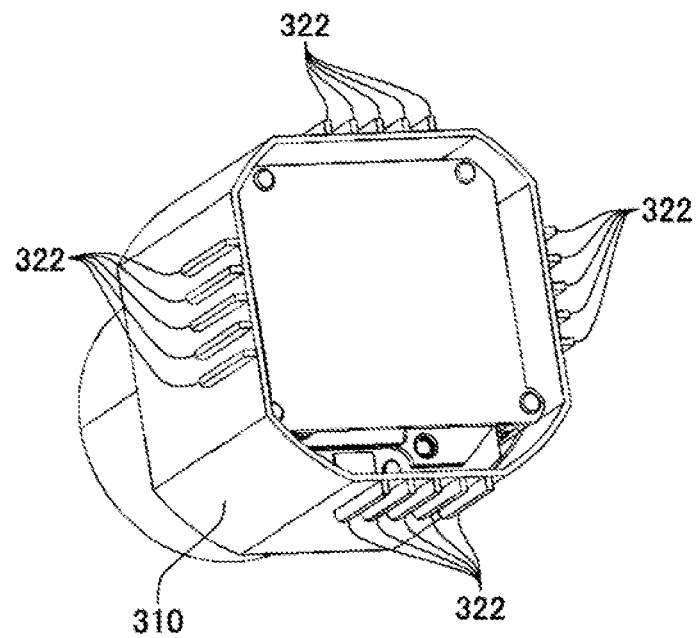
FIG. 11 is a diagram showing an example of a heat dissipation part.
Figure 12:
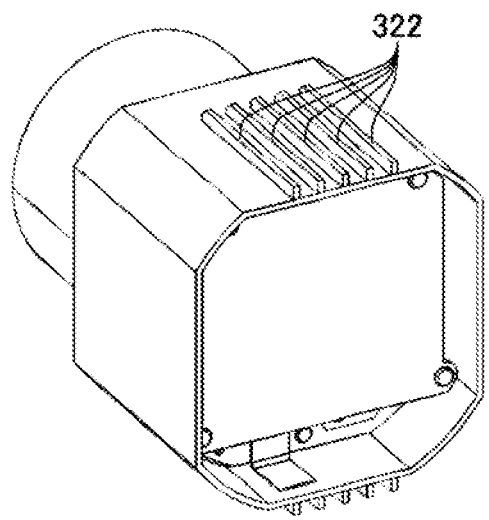
FIG. 12 is a diagram showing an example of a heat dissipation part.
Figure 13:
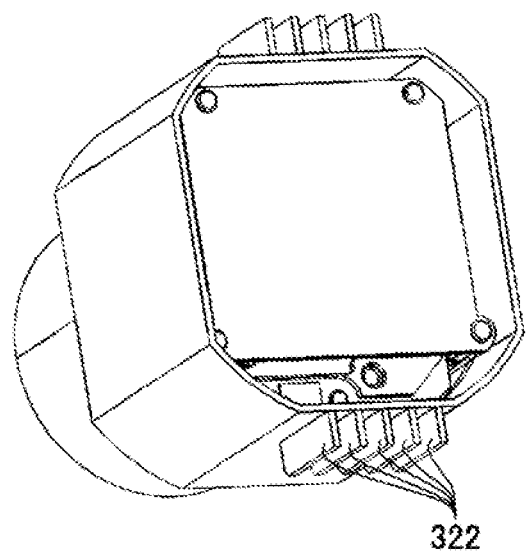
FIG. 13 is a diagram showing an example of a heat dissipation part.
Figure 14:
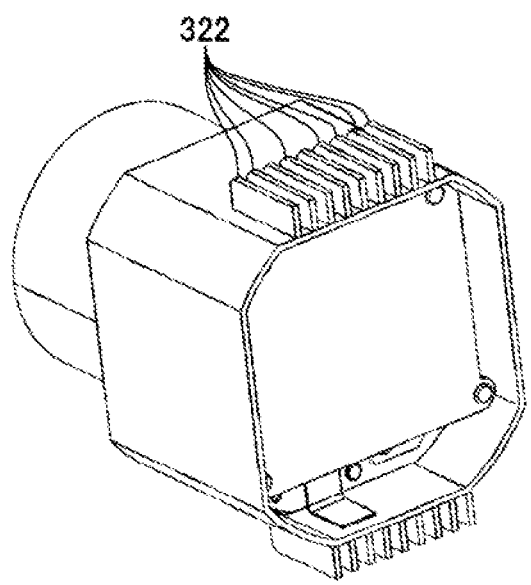
FIG. 14 is a diagram showing an example of a heat dissipation part.
Figure 15:
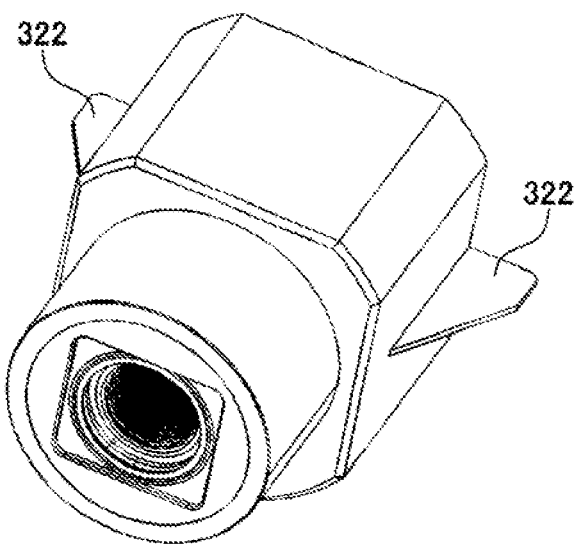
FIG. 15 is a diagram showing an example of a heat dissipation part.
Figure 16:
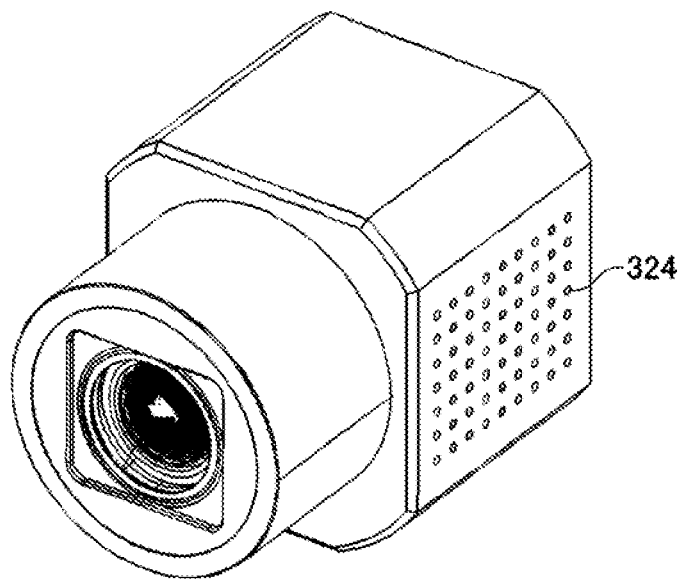
FIG. 16 is a diagram showing an example of a heat dissipation part.

FIG. 11 to FIG. 16 show an example of the heat dissipation part 320. As shown in FIG. 11, the plurality of fins 322 configuring the heat dissipation part 320 may be provided on a plurality of side surfaces that are outer surfaces of the housing 310. The length of the plurality of fins 322 may be any length. For example, like the plurality of fins 322 shown in FIG. 12, the plurality of fins 322 may have a shape longer than the plurality of fins 322 shown in FIG. 11. In addition, the height of the plurality of fins 322 may be any height. For example, like the plurality of fins 322 shown in FIG. 13, the plurality of fins 322 may have a shape higher than the plurality of fins 322 shown in FIG. 11. Furthermore, the number of the fins 322 may be any number. For example, as shown in FIG. 14, the number of fins 322 may be greater than the number of fins 322 shown in FIG. 11. The shape of the plurality of fins 322 may be any shape. For example, as shown in FIG. 15, the shape of the plurality of fins 322 may be a designed shape such as a delta wing. The plurality of fins 322 may have any shape that takes into account the air resistance of the UAV 100 during flight. The heat dissipation part 320 may have a plurality of recessed and protruding shapes. For example, as shown in FIG. 16, the heat dissipation part 320 may be configured by a plurality of dots 324. The heat dissipation part 320 may be configured by combining a plurality of fins 322 and a plurality of dots 324. For example, a plurality of fins 322 may be provided on two opposing side surfaces of the housing 310, and a plurality of dots 324 may be provided on the other two opposing side surfaces of the housing 310.

Figure 17:
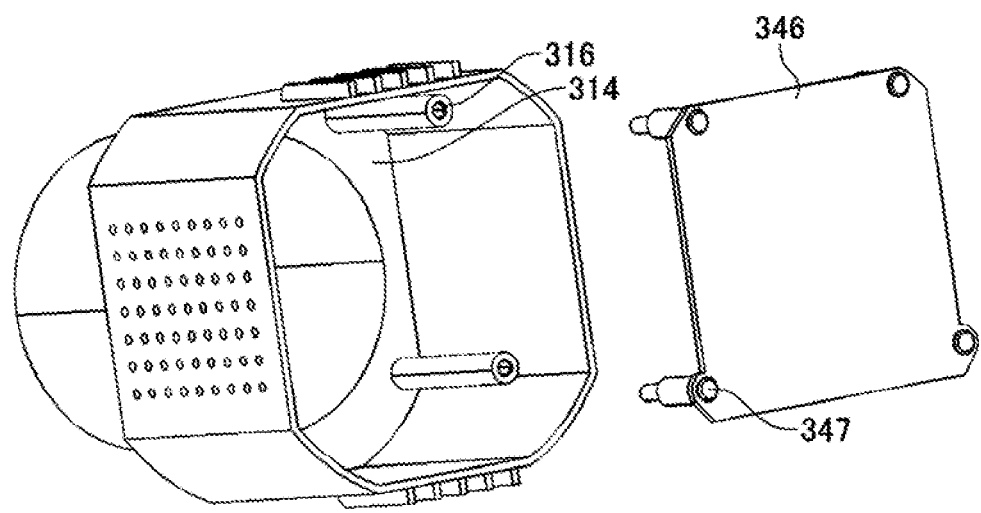
FIG. 17 is a diagram showing another example of a member thermally connected to the second plate.
Figure 18:
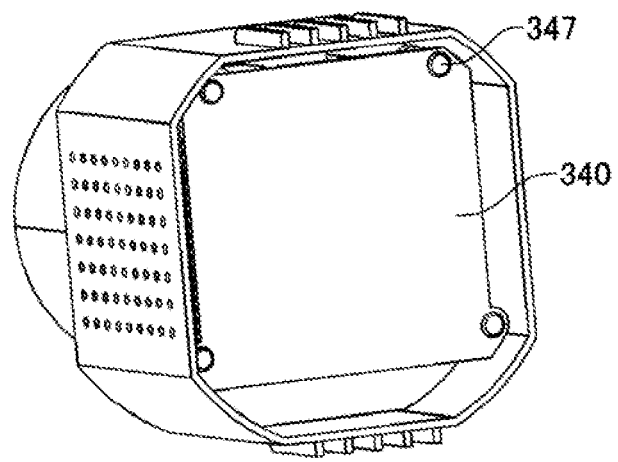
FIG. 18 is a diagram showing an example when the second plate is attached to a housing.

The member that transmits the heat generated by the image sensor 330 to the housing 310 may be configured by members other than the sheet 400. FIG. 17 shows another example of a member thermally connected to the second plate 346. FIG. 18 shows an example when the second plate 346 is attached to a housing 310. For example, the member may be a screw receiving unit 316 used for fixing the second plate 346 to the housing 310. The screw receiving unit 316 is provided on the inner surface 314 of the housing 310. The screw receiving unit 316 may be configured integrally with the housing 310. The second plate 346 is fixed to the screw receiving unit 316 via a screw 347. The heat generated by the image sensor 330 is transmitted to the housing 310 via the second plate 346 and the screw receiving unit 316.

Figure 19:
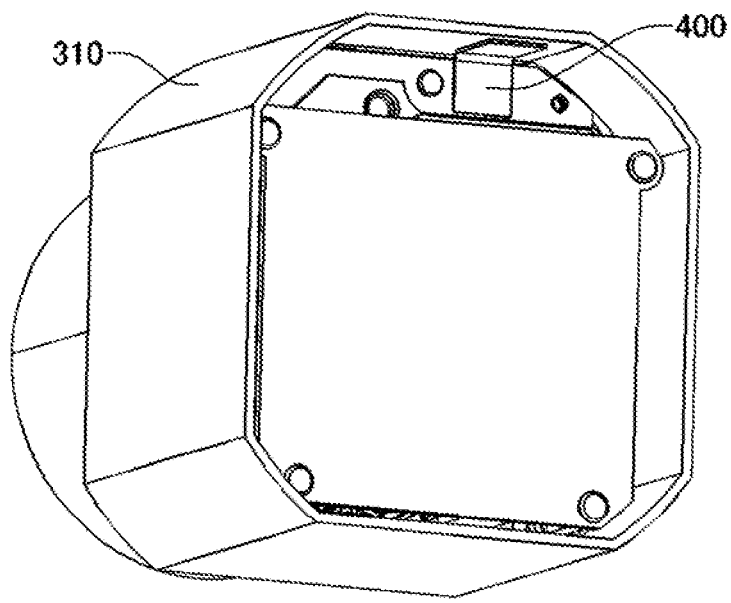
FIG. 19 is a diagram showing another example of the photographing device.

FIG. 19 is a diagram showing another example of a photographing device 300. As shown in FIG. 19, in the photographing device 300, a heat dissipation structure such as the fins 322 or the dots 324 also may not be provided on the outer surface of the housing 310. The heat generated by the image sensor 330 is efficiently transmitted to the housing 310 via the sheet 400. Therefore, the heat generated by the image sensor 330 is efficiently dissipated via the outer surface of the housing 310.

Figure 20:
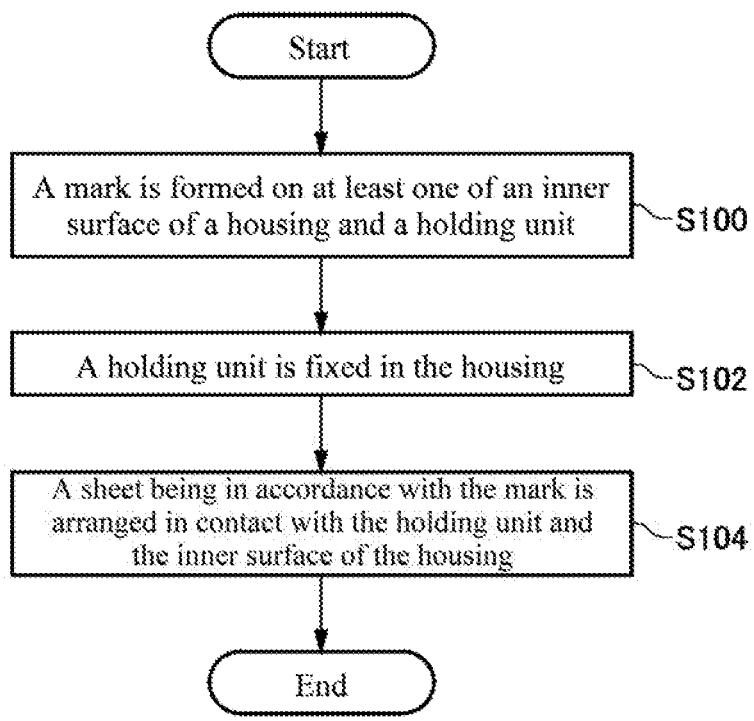
FIG. 20 is a flowchart showing an example of a procedure for manufacturing a photographing device.

FIG. 20 is a flowchart showing an example of a procedure for manufacturing a photographing device 300. A mark 500 is formed on at least one of the inner surface 314 of the housing 310 and the holding member 340 (S100). The mark 500 may be formed by laser processing, scribing, scratching, printing, or the like at a predetermined position of at least one of the inner surface 314 of the housing 310 and the holding member 340. In the process of forming the mark 500, a first mark 502 indicating an area to be contacted by a part of the sheet 400 may be formed on the inner surface 314 of the housing. In the process of forming the mark 500, a second mark 504 indicating an area to be contacted by another part of the sheet 400 may be formed on the holding member 340.

Next, the holding member 340 holding the image sensor 330 is fixed in the housing 310 (S102). Furthermore, in accordance with the mark 500, the sheet 400 is arranged in contact with the holding member 340 and the inner surface 314 of the housing 310 (S104). Thereafter, the lid unit 312 is fixed to the back surface of the housing 310.

As described above, the mark 500 indicating the area to be contacted by the sheet 400 is formed on at least one of the inner surface 314 of the housing 310 and the holding member 340. Therefore, the sheet 400 can be easily arranged at an appropriate position.

Although the present disclosure has been described using the embodiments, the technical scope of the present disclosure is not limited to the scope described in the above-described embodiments. It will be apparent to those skilled in the art that various modifications or improvements can be made with regard to the above embodiments. It is apparent from the description of the scope of the disclosure that modes with such modifications or improvements can be included in the technical scope of the present disclosure.

The order of execution of each process, such as the operations, procedures, steps, stages, etc. in the device, system, program, and method shown in the claims, description, and drawings is not expressly stated in terms of "before", "prior", etc. It should be noted that the output of the previous process can be realized in any order as long as it is not used in later processing. Operation flows in the claims, the specification, and the drawings are described using "first", "next", and the like for the sake of convenience, but it does not mean that the flows are necessarily to be performed in this order.

EXPLANATION OF REFERENCE NUMERALS

100 UAV
102 UAV main body
110 UAV control unit
150 Communication interface
160 Memory
200 Gimbal
210 Rotary wing mechanism
230 Photographing device
240 GPS receiver
260 Magnetic compass
270 Pressure altimeter
300 Photographing device
310 Housing
312 Lid unit
314 Inner surface
316 Screw receiving unit
320 Heat dissipation part
322 Fin
324 Dot
330 Image sensor
340 Holding member
342 Substrate
344 First plate
346 Second plate
347 Screw
350 Lens
352 First lens group
353 First lens holding member
354 Second lens group
355 Second lens holding member
356 Third lens group
357 Third lens holding member
358 Fourth lens group
359 Fourth lens holding member
360 Shaft
362 Fixed cylinder
364 Cam cylinder
366 Holding frame
368 Gear unit
370 Shutter unit
372 Stepping motor
380 Substrate
400 Sheet
402 Base material layer
404 Adhesive layer
406 Adhesive layer
408 Metal layer
500 Mark
502 First mark
504 Second mark

The invention claimed is:

1. A movable object comprising:
a body;
a photographing device including:
an image sensor;
a housing accommodating the image sensor;
a holder including an adjustor and configured to hold the image sensor, the adjustor being configured to adjust a least one of a position or an orientation of the image sensor;
a heat radiator including at least one of a recessed portion or a protruding portion on an outer surface of at least one side of the housing, the at least one side of the housing facing the body of the movable object; and
a heat conductor contacting the adjustor of the holder and an inner surface of the at least one side of the housing and configured to transmit heat generated by the image sensor to the housing;
a support member rotatably supporting the photographing device and configured to expose the at least one of the recessed portion or the protruding portion of the heat radiator; and
a propulsion system configured to propel the movable object.

2. The movable object of claim 1, wherein a mark indicating an area to be contacted by the heat conductor is provided on the inner surface of the at least one side of the housing or the holder.

3. The movable object of claim 2, wherein the mark comprises:
a first mark provided on the inner surface of the at least one side of the housing and indicating an area to be contacted by a part of the heat conductor, and
a second mark provided at the holder and indicating an area to be contacted by another part of the heat conductor.

4. The movable object of claim 1, wherein:
the holder further comprises a substrate on which the image sensor is mounted, the adjustor being thermally connected to the substrate and configured to adjust at least one of a position or an orientation of the substrate.

5. The movable object of claim 4, wherein the adjustor comprises:
a first plate configured to adjust the position of the substrate, and
a second plate configured to adjust the orientation of the substrate, and
the heat conductor contacts:
the inner surface of the at least one side of the housing, and
the first plate or the second plate.

6. The movable object of claim 1, wherein the heat radiator is provided on a part of an outer surface of the housing, and has a higher heat dissipation efficiency than other areas of the outer surface of the housing.

7. The movable object of claim 1, wherein the protruding portion includes at least one fin.

8. The movable object of claim 7, wherein:
the photographing device further includes a lens configured to project incident light on the image sensor, and
the at least one fin is arranged along an optical axis of the lens.

9. The movable object of claim 1, wherein the recessed portion is one of a plurality of recessed portions of the heat radiator, at least one of the plurality of the recessed portions having a dot shape, or the protruding portion is one of a plurality of protruding portions, at least one of the plurality of the protruding portions having a dot shape.

10. The movable object of claim 9, wherein the plurality of protruding portions include:
   at least one first protruding portion in a first area on an outer surface of the housing, each of the at least one first protruding portion having a fin shape;
   at least one second protruding portion in a second area on the outer surface of the housing, each of the at least one second protruding portion having a dot shape; and
   the first area or the second area includes the outer surface of the at least one side of the housing.

11. The movable object of claim 1, wherein the heat conductor includes a sheet.

12. The movable object of claim 11, wherein the sheet comprises a metal layer.

13. The movable object of claim 12, wherein the sheet further comprises an adhesive layer at least partially contacting an inner surface of the housing.

* * * * *